United States Patent Office 3,453,323
Patented July 1, 1969

3,453,323
**4-(2-HALOALKYL)SULFONYL-1-ARYLOXY-
ACETIC ACIDS**
Joseph Weinstock, Phoenixville, Pa., assignor to Smith
Kline & French Laboratories, Philadelphia, Pa., a corporation of Pennsylvania
No Drawing. Filed Aug. 2, 1965, Ser. No. 476,668
Int. Cl. C07c *147/08, 147/06*
U.S. Cl. 260—520            6 Claims

ABSTRACT OF THE DISCLOSURE

4 - (2 - haloalkyl)sulfonyl - 1 - aryloxyacetic acids are prepared from a 4 - (2 - hydroxyalkyl)thio - 1 - aryloxyacetic acid or, to prepare the 4 - (2 - bromoalkyl)sulfonyl compounds, from an aryloxyacetic acid through the 4 - thiocyanato, dithio and bromosulfonyl intermediates. These compounds have diuretic activity.

---

This invention relates to new 4 - (2 - haloalkyl)sulfonyl - 1 - aryloxyacetic acids, in particular 4 - (2 - haloalkyl)sulfonyl - 1 - phenoxyacetic acids and 4 - (2 - haloalkyl)sulfonyl - 1 - naphthyloxyacetic acids.

The compounds of this invention have pharmacological activity and are particularly useful as diuretic agents. Illustrative of the activity of an exemplary compound of this invention is the diuretic activity, in particular natriuretic activity, of 4 - bromoethylsulfonyl - 1 - naphthyloxyacetic acid at 25 mg./kg. orally in the dog.

The new compounds of this invention are represented by the following formula:

FORMULA I

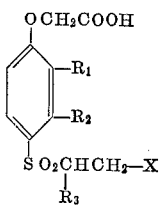

in which:

$R_1$ is hydrogen, halogen, lower alkyl or trifluoromethyl;
$R_2$ is halogen, lower alkyl, trifluoromethyl or, when $R_1$ is other than hydrogen, hydrogen; or
$R_1$ and $R_2$, taken together, form a naphthyl ring with the phenyl ring to which they are attached;
$R_3$ is hydrogen or lower alkyl; and
X is halogen.

The compounds of this invention are prepared by the following procedures:

*Procedure I*

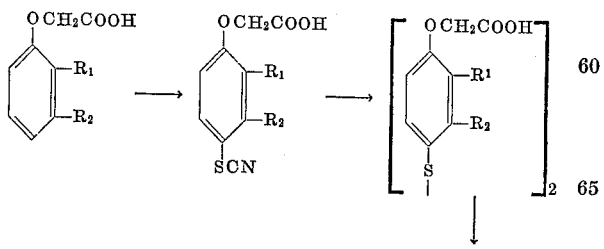

In Procedure I one of the terms $R_1$ and $R_2$ is hydrogen or lower alkyl or $R_1$ and $R_2$, taken together, form a naphthyl ring with the phenyl ring to which they are attached.

*Procedure II*

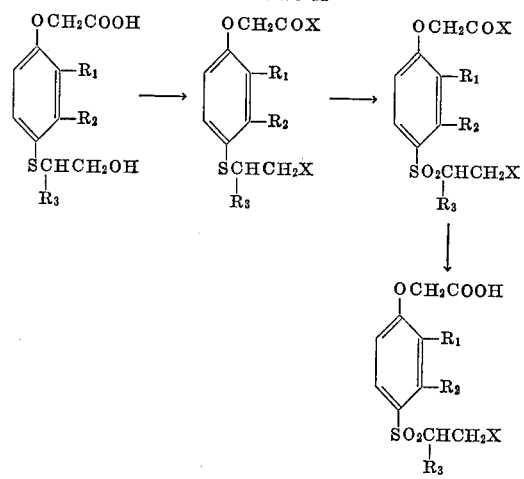

In Procedure II the term $R_1$, $R_2$, $R_3$ and X are as defined under Formula I.

According to Procedure I an aryloxyacetic acid, which may be prepared by reacting a phenol or naphthol with chloroacetic acid, is reacted with sodium thiocyanate and a halogen such as bromine or chlorine to give the 4-thiocyanato derivative of the aryloxyacetic acid. The thiocyanate is treated with hydrazine hydrate to give the dithio compound which is converted to the 4-bromosulfonyl-1-aryloxyacetic acid by treating with bromine in aqueous alcohol. Ethylene gas is introduced into a solution of the 4-bromosulfonyl compound in a solvent such as dimethoxyethane and the resulting mixture is radiated with ultraviolet or visible light to give the 4-(2-bromoalkyl)-sulfonyl-1-aryloxyacetic acid.

According to Procedure II, a 4-(2-hydroxyalkyl)-thio-1-aryloxyacetic acid is treated with a halogenating agent such as thionyl chloride or bromide gives the 4-(2-haloalkyl)thio-1-aryloxyacetyl halide which is oxidized, for example with hydrogen peroxide, to give the 4-(2-haloalkyl)sulfonyl-1-aryloxyacetyl halide which is hydrolyzed to give the 4-(2-haloalkyl)sulfonyl-1-aryloxyacetic acid.

The 4-(2-hydroxyalkyl)thio-1-aryloxyacetic acid intermediates are prepared by the following procedures:

(1) 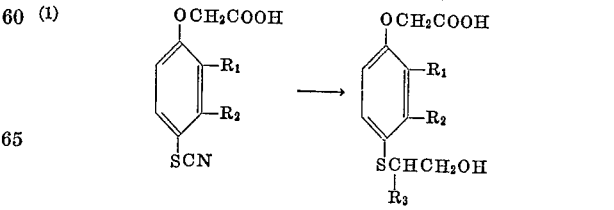

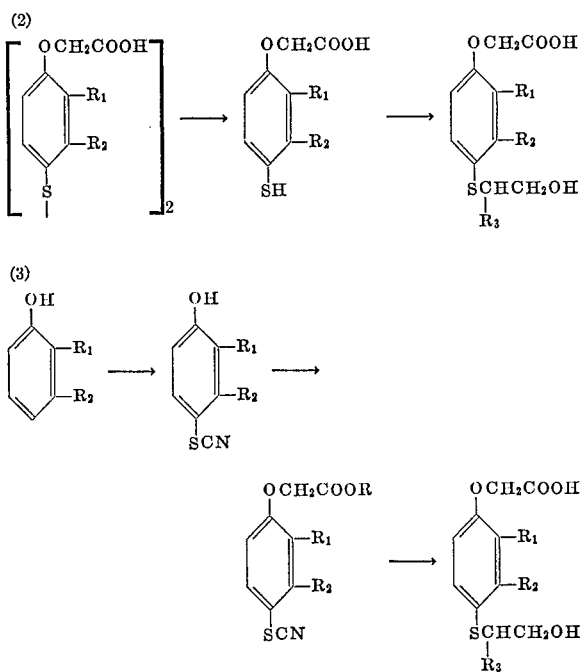

In (1) and (2) above, one of $R_1$ and $R_2$ is hydrogen or lower alkyl or $R_1$ and $R_2$, taken together, form a naphthyl ring with the phenyl ring to which they are attached and $R_3$ is hydrogen or lower alkyl.

In (3) above, the terms $R_1$, $R_2$ and $R_3$ are as defined under Formula I and R is lower alkyl.

According to (1) above, a 4-thiocyanato derivative of the aryloxyacetic acid, prepared as in Procedure I, is reacted with a β-halo lower alkanol in basic aqueous solution such as sodium hydroxide solution to give a 4-(2-hydroxyalkyl)thio-1-aryloxyacetic acid.

According to (2) above this 4-(2-hydroxyalkyl)thio intermediate is prepared by treating the bisthio compound, prepared as in Procedure I, with a reducing agent such as sodium borohydride to give a 4-mercapto-1-aryloxyacetic acid which is reacted with a β-halo lower alkanol.

According to (3) above, a phenol or naphthol is reacted with sodium thiocyanate and a halogen such as bromine or chlorine to give the 4-thiocyanato derivative. Treating this intermediate with a lower alkyl haloacetate in a basic solution gives the lower alkyl 4-thiocyanato-1-aryloxyacetate which is dissolved in basic solution, such as aqueous sodium hydroxide solution, and treated with a β-halo lower alkanol to give a 4-(2-hydroxyalkyl)thio-1-aryloxyacetic acid.

The following examples are not limiting but are illustrative of the compounds of this invention and of the methods of preparing them.

EXAMPLE 1

A solution of 25 g. of bromine in 25 ml. of methanol saturated with sodium bromide is added dropwise over 2.5 hours to a stirred suspension of 28.3 g. of 1-naphthyloxyacetic acid, 100 ml. of methanol saturated with sodium bromide and 40 g. of sodium thiocyanate at 0–5° C. The mixture is allowed to warm to room temperature and then poured into 750 ml. of ice water. The material which separates is collected by filtration and recrystallized from aqueous methanol. The solid material is treated with dilute ammonium hydroxide at pH 8.5 and filtered. The filtrate is acidified with hydrochloric acid and the solid material is filtered off and recrystallized from toluene to give 4-thiocyanato-1-naphthyloxyacetic acid.

The above prepared compound (56.3 g.) is dissolved in 1 liter of ethanol. To the solution 46 ml. of hydrazine hydrate is added dropwise and the resulting mixture is refluxed for one hour, then concentrated in vacuo. The residue is treated with 2 liters of water. Dilute hydrochloric acid is added to the residue slowly with stirring to pH 1. The precipitate is filtered off, dried and recrystallized from ethyl acetate-hexane to give 4,4'-dithiobis[1-naphthyloxyacetic acid].

The above prepared bisthio compound (2.33 g.), suspended in 20 ml. of water, is treated with 20 ml. of ether. The resulting mixture is stirred vigorously at 0–5° C. and 12.5 g. of bromide is added dropwise over a period of one hour. The mixture is stirred at 0–5° C. for two hours. The ether layer is separated from the aqueous layer and the aqueous solution is washed with ether. The ether solutions are combined and dried. The ether is removed in vacuo and the residue is recrystallized from toluene to give 4-bromosulfonyl-1-naphthyloxyacetic acid.

Ethylene gas is bubbled into a solution of 5.5 g. of 4-bromosulfonyl-1-naphthyloxyacetic acid in 1 liter of dichloroethane with stirring for 66 hours under radiation of an unfrosted incandescent lamp. The precipitate is collected and recrystallized from toluene-hexane to give 4-(2-bromoethyl)sulfonyl-1-naphthyloxyacetic acid.

EXAMPLE 2

To a solution of 5.7 g. of 4,4'-dithiobis[1-naphthyloxyacetic acid], prepared as in Example 1, in 125 ml. of water is added 10 ml. of 10% sodium hydroxide solution. The resultant solution is treated with 0.76 g. of sodium borohydride and then allowed to stand at room temperature for three hours. Dilute hydrochloric acid is added slowly until the solution has a pH of about 1. Filtering gives 4-mercapto-1-naphthyloxyacetic acid.

Ethylene chlorohydrin (3.5 ml.) is added to a solution of 9.4 g. of 4-mercapto-1-naphthyloxyacetic acid in 75 ml. of water containing 4 g. of sodium hydroxide. The mixture is heated and stirred on a steam bath for 2.5 hours, then cooled and acidified with 3 N hydrochloric acid. The precipitate is collected by filtration, dried and recrystallized from ethyl acetate to give 4-(2-hydroxyethyl)thio-1-naphthyloxyacetic acid.

To a suspension of 2.8 g. of 4-(2-hydroxyethyl)thio-1-naphthyloxyacetic acid in 40 ml. of dry benzene is added 2.5 g. of thionyl chloride and the resulting mixture is heated at reflux for 2¼ hours. The solution is concentrated in vacuo, treated with toluene and again concentrated to give 4-(2-chloroethyl)thio-1-naphthyloxyacetyl chloride as the residue. This intermediate is dissolved in 35 ml. of acetic acid and 3 ml. of 30% hydrogen peroxide solution is added. The resulting mixture is allowed to stand at room temperature for 18 hours, another 3 ml. of 30% hydrogen peroxide solution is added and the mixture is heated for two hours on a steam bath, then poured into 250 ml. of ice water. Extracting with ethyl acetate, evaporating the solvent from the extracts and recrystallizing the residue from toluene gives 4-(2-chloroethyl)sulfonyl-1-naphthyloxyacetyl chloride. Heating a solution of 1.0 g. of this acetyl chloride in a 50% dimethylformamide-water mixture on a steam bath for two hours and recrystallizing from a water-ethanol mixture gives 4-(2-chloroethyl)sulfonyl-1-naphthyloxyacetic acid.

EXAMPLE 3

A mixture of 1.5 l. of acetic acid and 50 ml. of acetic anhydride is refluxed for 40 minutes, then cooled. Chlorine (37 g.) is bubbled into the mixture. To the resulting mixture 43.6 g. of sodium thiocyanate is added and the mixture is stirred at room temperature for 30 minutes. 3-chlorophenoxyacetic acid (45.8 g.) is added and the mixture is stirred at room temperature for 70 hours. The mixture is diluted with 7 l. of water, chilled and filtered to give 3-chloro-4-thiocyanato-1-phenoxyacetic acid.

Hydrazine hydrate (5.7 ml.) is added to a solution of 4.15 g. of 3-chloro-4-thiocyanate-1-phenoxyacetic acid in 100 ml. of ethanol. The mixture is heated at reflux for 70 minutes, then concentrated. The residue is dissolved in 200 ml. of water and the aqueous solution is acidified with 3 N hydrochloric acid to about pH 1. The precipitate is collected by filtration and recrystallized from ethyl acetate-hexane to give 4,4'-dithiobis[3-chloro-1-phenoxyacetic acid].

Bromine (11.5 g.) is added dropwise with stirring to a suspension of 3.2 g. of the above prepared dithio compound in 30 ml. of ether and 30 ml. of water at 0–5° C. The mixture is then stirred for three hours, then concentrated in vacuo at 5° C. The precipitate is collected by filtration, then recrystallized from toluene to give 4-bromosulfonyl-3-chloro-1-phenoxyacetic acid.

Ethylene is bubbled into a solution of 0.495 g. of 4-bromosulfonyl-3-chloro-1-phenoxyacetic acid in 10 ml. of dry 1,2-dimethoxyethane for five minutes. The flask is then stoppered and radiated with an ultraviolet lamp with water cooling for about five hours. The mixture is concentrated in vacuo and the residue is treated with toluene. Filtering and recrystallizing from ethyl acetate-hexane gives 4-(2-bromoethyl)sulfonyl-3-chloro-1-phenoxyacetic acid.

EXAMPLE 4

A solution of 2.44 g. of 3-chloro-4-thiocyanato-1-phenoxyacetic acid, prepared as in Example 3, in 30 ml. of water containing 1.2 g. of sodium hydroxide is heated on a steam bath for five minutes. Ethylene chlorohydrin (1.3 ml.) is added and the mixture is heated on a steam bath for three hours with occasional shaking. Cooling, acidifying with 3 N hydrochloric acid and filtering gives 3-chloro-4-(2-hydroxyethyl)thio-1-phenoxyacetic acid.

A suspension of 1.8 g. of 3-chloro-4-(2-hydroxyethyl)thio-1-phenoxyacetic acid in 20 ml. of dry benzene is treated with 1.9 g. of thionyl chloride. The mixture is refluxed for 2¼ hours, then concentrated in vacuo. Toluene is added and the mixture is again concentrated. The residue which is 3-chloro-4-(2-chloroethyl)thio-1-phenoxyacetyl chloride is dissolved in 18 ml. of acetic acid. To this mixture is added 3 ml. of 30% hydrogen peroxide solution and the resulting mixture is allowed to stand at room temperature for 18 hours. Another 3 ml. of 30% hydrogen peroxide solution is added and the mixture is heated on a steam bath for two hours, then poured into ice water. The product is extracted into ethyl acetate. The extracts are concentrated and the residue is crystallized with toluene. Recrystallization from ethyl acetate-hexane gives 3-chloro-4-(2-chloroethyl)sulfonyl-1-phenoxyacetyl chloride. A solution of 1.0 g. of this acetyl chloride in 10 ml. of dimethylformamide containing 3 ml. of water is heated on a steam bath for two hours, then water is added to give 3-chloro-4-(2-chloroethyl)sulfonyl-1-phenoxyacetic acid.

EXAMPLE 5

2,3-dichlorophenol (81.5 g.) is dissolved in 300 ml. of methanol saturated with sodium bromide. To this solution is added 143 g. of sodium thiocyanate and the mixture is kept at 0–5° C. Bromine (88 g.) in 90 ml. of sodium bromide saturated methanol is added dropwise over two hours. The mixture is stirred at 0–5° C. for 30 minutes, then allowed to warm to room temperature and poured into 3 l. of ice-water. The precipitate is collected, dried and extracted with chloroform. Hexane is added to the extract and the resulting precipitate is collected, dried and recrystallized from ether-hexane to give 2,3-dichloro-4-thiocyanatophenol.

Eleven grams of 2,3-dichloro-4-thiocyanatophenol dissolved in 150 ml. of dried acetone is treated with 10 ml. of triethylamine. The mixture is heated to reflux on a steam bath and 6.5 ml. of ethylbromoacetate is added. The resulting mixture is refluxed with stirring for 2.5 hours, then cooled and allowed to stand overnight. The mixture is filtered and the filtrate is evaporated to give, as the residue, ethyl 2,3-dichloro-4-diocyanato-1-phenoxyacetate.

Fifteen grams of ethyl 2,3-dichloro-4-thiocyanato-1-phenoxyacetate is dissolved in 200 ml. of water containing 5 g. of sodium hydroxide. To the solution 5 ml. of ethylene chlorohydrin is added and the resulting mixture is heated at reflux for 2.5 hours, then cooled and filtered. The filtrate is slowly acidified with 3 N hydrochloric acid to pH. The precipitate is collected, washed with hot benzene and recrystallized from ethyl acetate-hexane to give 2,3-dichloro-4-(2-hydroxyethyl)thio-1-phenoxyacetic acid.

To a solution of 4.2 g. of 2,3-dichloro-4-(2-hydroxyethyl)thio-1-phenoxyacetic acid in 100 ml. of dried benzene is added 3.5 g. of thionyl chloride and the resulting mixture is refluxed for 2.5 hours. The solvent and excess thionyl chloride are removed in vacuo, 20 ml. of toluene is added to the residue and the mixture is again concentrated in vacuo. The residue is dissolved in 30 ml. of acetic acid and then 10 ml. of 30% hydrogen peroxide solution is added. The mixture is allowed to stand at room temperature overnight, then heated on a steam bath for one hour. Another 10 ml. of 30% hydrogen peroxide is added and the mixture is heated for two hours on a steam bath. Water (150 ml.) is added and the mixture is allowed to stand. The precipitate is collected by filtration, washed with hot benzene and recrystallized from ethanol to give 2,3-dichloro-4-(2-chloroethyl)sulfonyl-1-phenoxyacetyl chloride. Heating this acetyl chloride in a 50% dimethylformamide-water mixture on a steam bath for two hours gives 2,3-dichloro-4-(2-chloroethyl)sulfonyl-1-phenoxyacetic acid.

EXAMPLE 6

2,3-xylyloxyacetic acid is converted to the 4-thiocyanato derivative by the procedure of Example 3 and the 2,3-dimethyl-4-thiocyanato-1-phenoxyacetic acid is reacted as in Example 4 to give 4-(2-chloroethyl)sulfonyl-2,3-dimethyl-1-phenoxyacetic acid.

EXAMPLE 7

By the procedure of Example 3, using 44.3 g. of 3-ethylphenoxyacetic acid the product is 4-(2-bromoethyl)-sulfonyl-3-ethyl-1-phenoxyacetic acid.

EXAMPLE 8

Using 47.2 g. of 2-propylphenoxyacetic acid in the procedure of Example 3 the product is 4-(2-bromoethyl)-sulfonyl-2-propyl-1-phenoxyacetic acid.

EXAMPLE 9

By the procedure of Example 3 using 50.2 g. of 3-butylphenoxyacetic acid the product is 4-(2-bromoethyl)-sulfonyl-3-butyl-1-phenoxyacetic acid.

EXAMPLE 10

According to the procedure of Example 5, using 81 g. of 3-trifluoromethylphenol the product is 4-(2-chloroethyl)sulfonyl-3-trifluoromethyl-1-phenoxyacetic acid.

EXAMPLE 11

By the procedure of Example 3, using 56.8 g. of 3-bromo-1-phenoxyacetic acid the product is 3-bromo-4-(2-bromoethyl)sulfonyl-1-phenoxyacetic acid.

EXAMPLE 12

A solution of 2.6 g. of 4-thiocyanato-1-naphthyloxyacetic acid in 30 ml. of water containing 1.2 g. of sodium hydroxide is heated on a steam bath for five minutes. 2-chloropropanol (1.88 g.) is added and the resulting mixture is heated on a steam bath for three hours. Working up as in Example 4 gives 4-(1-hydroxy-2-propyl)thio-1-naphthyloxyacetic acid.

Refluxing the above prepared 1-hydroxy-2-propyl compound with thionyl chloride in benzene, oxidizing the resulting 4-(1-chloro-2-propyl)thio compound with hydrogen peroxide and hydrolyzing as in Example 4 gives 4-(1-chloro-2-propyl)sulfonyl-1-naphthyloxyacetic acid.

EXAMPLE 13

By the procedure of Example 4, using 2.44 g. of 3-chloro-4-thiocyanato-1-phenoxyacetic acid and 2.16 g. of 2-chloro-1-butanol, oxidizing the 3-chloro-4-(1-hydroxy-2-butyl)thio-1-phenoxyacetic acid with hydrogen peroxide and hydrolyzing gives 3-chloro-4-(1-chloro-2-butyl)sulfonyl-1-phenoxyacetic acid.

EXAMPLE 14

To a solution of 15 g. of ethyl 2,3-dichloro-4-thiocyanato-1-phenoxyacetate (prepared as in Example 5) in 200 ml. of water containing 5 g. of sodium hydroxide is added 9.2 g. of 2-chloro-1-pentanol. The resulting mixture is heated at reflux for 2.5 hours, then worked up as in Example 5 to give 2,3-dichloro-4-(1-hydroxy-2-pentyl)thio-1-phenoxyacetic acid.

To a suspension of 1.9 g. of 2,3-dichloro-4-(1-hydroxy-2-pentyl)thio-1-phenoxyacetic acid in benzene is added 1.4 g. of thionyl bromide and the resulting mixture is refluxed for one hour. Adding another 1.4 g. of thionyl bromide, refluxing for another hour and working up as in Example 2 gives 4-(1-bromo-2-pentyl)thio-2,3-dichloro-1-phenoxyacetyl bromide.

Oxidizing with 30% hydrogen peroxide and hydrolyzing by heating with dimethylformamide-water gives 4-(1-bromo - 2 - pentyl)sulfonyl - 2,3 - dichloro - 1 - phenoxyacetic acid.

EXAMPLE 15

3-chloro-2-methylphenol (53 g.) is dissolved in 150 ml. of water containing 16.4 g. of sodium hydroxide and to this solution is added 39 g. of chloroacetic acid, followed immediately by 150 ml. of a sodium hydroxide solution containing 24 g. of sodium hydroxide. The mixture is heated with stirring for two hours, then chilled and the precipitate is collected, then dissolved in water. The aqueous solution is acidified with 3 N hydrochloric acid. The precipitate is collected and recrystallized from chloroform using charcoal to give 3-chloro-2-methyl-1-phenoxyacetic acid.

A mixture of 300 ml. of acetic acid and 10 ml. of acetic anhydride is refluxed for 40 minutes, then cooled. Chlorine (7.4 g.) is dissolved in the cooled solution by bubbling chlorine gas into the solution. To the resulting solution, 8.7 g. of sodium thiocyanate is added and the mixture is stirred at room temperature for 30 minutes. 3-chloro-2-methyl-1-phenoxyacetic acid (9.9 g.) is added. The mixture is stirred at room temperature for 70 hours, then diluted with 1.5 l. of water, cooled and the precipitate is collected by filtration. This solid material is dissolved in 5% sodium bicarbonate solution, the solution is filtered and acidified and the precipitate is filtered off and recrystallized from ethyl acetate-cyclohexane to give 3-chloro-2-methyl-4-thiocyanato-1-phenoxyacetic acid.

By the procedure of Example 2, the above prepared compound is treated with thionyl chloride to give 3-chloro - 4 - (2 - chloroethyl)thio - 2 - methyl - 1 - phenoxyacetyl chloride. Oxidizing with hydrogen peroxide and hydrolyzing gives 3-chloro-4-(2-chloroethyl)sulfonyl-2-methyl-1-phenoxyacetic acid.

What is claimed is:
1. A compound of the formula:

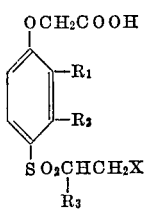

in which:

$R_1$ is hydrogen, halogen, lower alkyl or trifluoromethyl;
$R_2$ is halogen, lower alkyl or trifluoromethyl or, when $R_1$ is other than hydrogen, hydrogen or
$R_1$ and $R_2$, taken together, form a naphthyl ring with the phenyl ring to which they are attached;
$R_3$ is hydrogen or lower alkyl; and
X is halogen.

2. A compound of the formula:

in which X is halogen.

3. A compound of the formula:

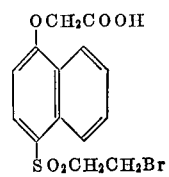

4. A compound of the formula:

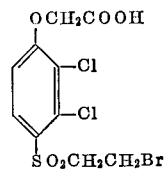

5. A compound of the formula:

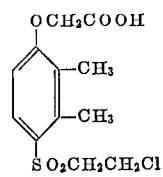

6. A compound of the formula:

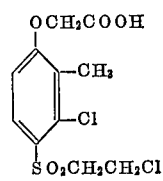

References Cited

UNITED STATES PATENTS

| | | | |
|---|---|---|---|
| 3,322,821 | 5/1967 | Cragoe | 260—521 |
| 3,255,241 | 6/1966 | Schultz et al. | 260—521 |
| 3,275,685 | 9/1966 | Schultz | 260—521 |

D. STENZEL, *Assistant Examiner.*

LORRAINE A. WEINBERGER, *Primary Examiner.*

U.S. Cl. X.R.

260—454, 516, 521, 544, 999